3749

JOHN F. FISHER.

Guano Attachment.

for Wheat Drills.

Reissued

Nov 30 1869

Witnesses

Wm H Seaman

G. E. Breed

Inventor J. F. Fisher

Daniel Breed

Assee. & Atty.

UNITED STATES PATENT OFFICE.

JOHN F. FISHER, OF GREENCASTLE, PENNSYLVANIA, ASSIGNOR TO HIMSELF, AND DANIEL BREED, OF WASHINGTON, DISTRICT OF COLUMBIA.

IMPROVEMENT IN GUANO ATTACHMENTS FOR SEED-DRILLS.

Specification forming part of Letters Patent No. 90,653, dated June 1, 1869; Reissue No. 3,749, dated November 30, 1869.

*To all whom it may concern:*

Be it known that I, JOHN F. FISHER, of Greencastle, in the county of Franklin and State of Pennsylvania, have invented certain new and useful Improvements in Guano Attachments to Wheat-Drills; and I do hereby declare that the following is a full and exact description thereof, reference being had to the accompanying drawings, and to the letters of reference marked thereon.

My invention consists of an arrangement of screw cog-gearing and other devices for operating the stirrers of a guano attachment to wheat-drills.

Figure 2:
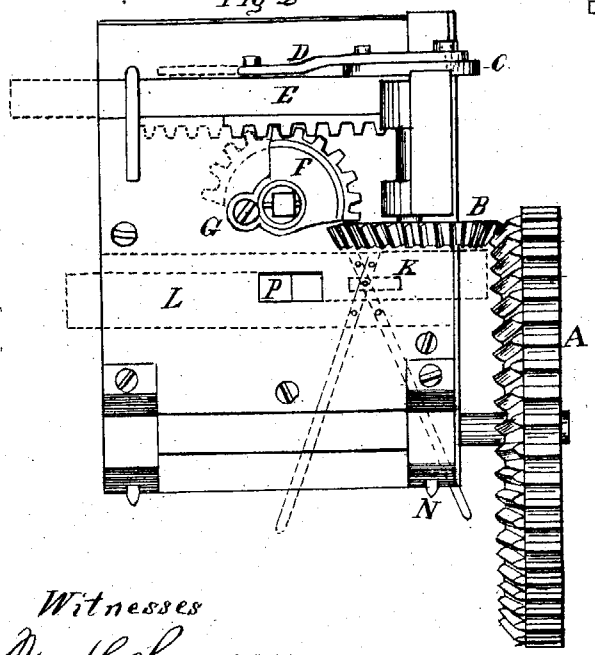
Figure 3:
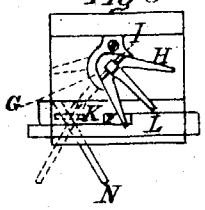
Figure 1:
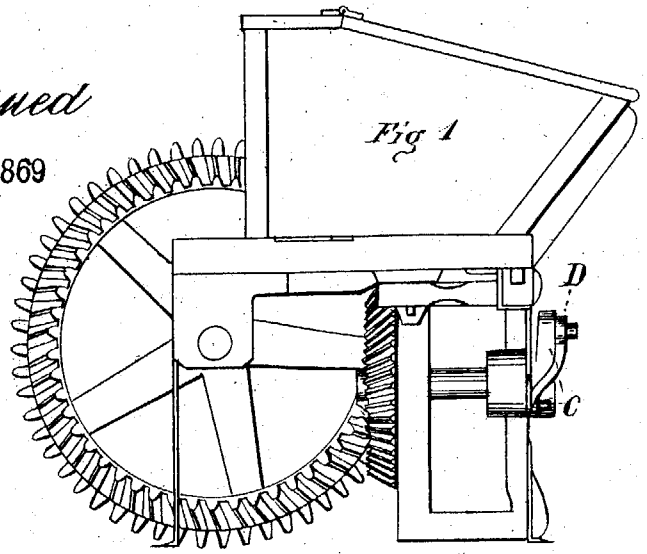

In the accompanying drawings, Figure 1 is a side view of a machine with my improvements attached. Fig. 2 is a bottom view of the same. Fig. 3 is a detached view of a portion of the inside of the hopper.

The gear-wheel A is provided with two sets of cogs, one being on the circumference of the wheel and of the usual form, while the other set of cogs is not only beveled, but also inclined to the radius of the wheel, forming what is called a "screw-gear." A pinion, B, is also provided with a corresponding screw-gear, which engages with the screw-gear or wheel A. This bevel-gear is very important, because the two axles of wheels A and B cannot be brought into the same line or horizontal plane, so as to use a common pinion, without changing the present convenient plan of our machine. The shaft of pinion B has a crank, C, which, by means of a connecting-rod, D, gives a reciprocating motion to the rack-bar E when the wheel A is set in motion. The rack-bar E gears into a quarter-pinion, F, upon the shaft G, which extends up into the hopper and carries fingers or stirrers H and I, Fig. 3, thus communicating motion from the rack-bar to these fingers, which stir the guano or other fertilizer in the hopper. The feed-hole P, in the bottom of the hopper, is opened and closed by means of the two slides K and L, and a lever, N, as shown mostly in dotted lines in Fig. 2. The two slides being pivoted to the lever N, the feed-hole P may be opened more or less, so as to feed fast or slow, or stop the feed at pleasure. The two slides move in opposite directions, and thus the center of feed is always at the same point, whether the feed is fast or slow.

In place of the quarter-pinion F, a crank or swinging arm may be used, the same being pivoted or connected with the reciprocating bar E; but I prefer the cog-gear above described.

Having thus described my invention, I claim—

1. The above-described screw bevel-gear or its equivalent for operating the stirrers of a guano attachment to wheat-drills or other fertilizer-machine, substantially as set forth.

2. The quarter-pinion F and reciprocating rack-bar E, placed under the hopper, in combination with the swinging fingers or stirrers inside of the hopper, substantially as set forth.

3. In combination with the stirrers and quarter-pinion, the reciprocating bar E, the rod D, crank C, pinion B, and gear-wheel A, substantially as set forth.

JOHN F. FISHER.

Witnesses:

G. D. CARL,

H. W. SCOTT.